US012705312B2

(12) United States Patent
Wise et al.

(10) Patent No.: US 12,705,312 B2
(45) Date of Patent: Aug. 11, 2026

(54) THIRD PARTY INTERFACE FOR SYSTEMS PROVIDING ACCESS MANAGEMENT AS A SERVICE

(71) Applicant: Pax8, Inc., Greenwood Village, CO (US)

(72) Inventors: Jeffrey Wise, Colorado Springs, CO (US); Travis Cartwright, Arvada, CO (US); Theresa Wendland, Greenwood Village, CO (US); Oscar Bellechasse, Greenwood Village, CO (US); Daniel McGough, Greenwood Village, CO (US); Jeremy Frank, Greenwood Village, CO (US); Cody Hanson, Greenbay, WI (US)

(73) Assignee: Pax8, Inc., Greenwood Village, CO (US)

( * ) Notice: Subject to any disclaimer, the term of this patent is extended or adjusted under 35 U.S.C. 154(b) by 230 days.

(21) Appl. No.: 18/139,207

(22) Filed: Apr. 25, 2023

(65) Prior Publication Data

US 2024/0362302 A1 Oct. 31, 2024

(51) Int. Cl.
*G06F 21/10* (2013.01)

(52) U.S. Cl.
CPC .................................. *G06F 21/105* (2013.01)

(58) Field of Classification Search
CPC ..................................................... G06F 21/105
See application file for complete search history.

(56) References Cited

U.S. PATENT DOCUMENTS

| | | | | |
|---|---|---|---|---|
| 9,846,899 | B1 * | 12/2017 | Stickle | G06Q 30/06 |
| 9,971,881 | B1 * | 5/2018 | Adam | G06F 21/604 |
| 2006/0106821 | A1 * | 5/2006 | Cox | G06F 21/105 |
| 2011/0213721 | A1 | 9/2011 | Raley et al. | |
| 2014/0189346 | A1 | 7/2014 | Cureton | |
| 2014/0289184 | A1 * | 9/2014 | Biswas | G06Q 50/184<br>707/E17.014 |
| 2014/0379593 | A1 * | 12/2014 | Koehler | G06F 21/105<br>705/318 |
| 2016/0005016 | A1 * | 1/2016 | Eliahu | G06Q 20/1235<br>705/44 |
| 2016/0162666 | A1 * | 6/2016 | Casey | G06Q 30/018<br>726/29 |
| 2017/0032378 | A1 * | 2/2017 | Ciszewski | G06Q 30/018 |
| 2021/0240799 | A1 * | 8/2021 | Wong | G06F 21/10 |
| 2022/0043642 | A1 * | 2/2022 | Maturi | H04L 67/34 |

FOREIGN PATENT DOCUMENTS

| | | |
|---|---|---|
| WO | WO2019/241171 | 12/2019 |

* cited by examiner

*Primary Examiner* — Dao Q Ho
(74) *Attorney, Agent, or Firm* — Brownstein Hyatt Farber Schreck, LLP

(57) ABSTRACT

A system and method for providing access to third-party software tools as a service. A standardized interface is provided for vendors to communicate with the service. In particular, one or more license information API endpoints allow vendors to provide license provisioning information related to the provisioning of a license to a third-party software tool and/or license information about the license to the service.

20 Claims, 12 Drawing Sheets

400

402 https://company.com/manage/provision GO

MSP A

404

LICENCE PROVISIONING

*Software Vendor:* Vendor A

*Software Product:* Product A

*Licensee:* Customer A

*Number of Licensees:* 1

CANCEL PROVISION

400

402 https://company.com/generate-invoice

GO

MSP A

404

GENERATE INVOICE

Customer: Customer A

Software Product(s): (Multiple Selected)

From: 2023-01-01

To: 2023-02-01

CANCEL

GENERATE

THIRD PARTY INTERFACE FOR SYSTEMS PROVIDING ACCESS MANAGEMENT AS A SERVICE

TECHNICAL FIELD

Embodiments described herein relate to access management systems for third-party software tools and, in particular, to systems and methods for vendor integration with such access management systems.

BACKGROUND

An organization may provide its employees with access to one or more software tools to facilitate collaboration and completion of work. In lieu of developing in-house software tools and services, a typical organization licenses access for its employees to various third-party software tools, such as email services, document storage systems, office suites, design platforms, and so on. To simplify business operations, many organizations (especially small and medium-sized businesses) engage a managed service provider (MSP) to administer, support, and provide access to third-party software tools from one or more third-party software vendors. However, managing organizations as clients, supporting their software deployments, managing software licenses on behalf of organizations, and understanding various billing tiers and discount structures of multiple third-party software vendors is often a cumbersome and time consuming process for both MSPs and organizations alike, often resulting in inefficient over-purchasing by organizations and/or tedious manual management of licenses and provisioning/deployment of services by MSPs.

An access management system for third-party software tools may streamline the provisioning and deployment of third-party software tools by, among other things, allowing MSPs to manage licenses for software tools from multiple third parties in a unified interface. To provide access management as a service, an access management system may communicate with several third-party services to obtain, alter, and cancel licenses for third-party software tools in response to commands issued by an MSP on behalf of an organization. Interfacing with third-party services efficiently and robustly is thus important to the operation of an access management system.

SUMMARY

Embodiments described herein relate to access management systems for third-party software tools and, in particular, to systems and methods for vendor integration with such access management systems. In one embodiment, a server system includes a memory resource and a processing resource. The processing resource is operably intercoupled with the memory resource and configured to instantiate an instance of software configured to communicate with a third-party application programming interface (API) endpoint of a third-party system to provide a request to provision a license to a third-party software tool of the third party on behalf of a licensee, provide a license provisioning information API endpoint for receiving license provisioning information about the request to provision the license to the third-party software tool, receive license provisioning information about the request to provision the license to the third-party software tool from the third-party system via the license provisioning API endpoint, and store the received license provisioning information in a database.

In one embodiment, the request to provision the license to the third-party software tool includes information about how to access the license provisioning information API endpoint.

In one embodiment, the instance of software is configured to detect an error related to the provisioning of the third-party software tool based on the license provisioning information.

In one embodiment, the license provisioning information includes a status of the request to provision the license to the third-party software tool in the third-party system. The status may indicate whether the provisioning of the license to the third-party software tool succeeded, failed, or is in progress.

In one embodiment, the instance of software is configured to cause a graphical user interface to be displayed by an instance of frontend software instantiated by a client device communicably coupled to the server system, the graphical user interface showing the license provisioning information. The graphical user interface may show a status of the provisioning of the license to the third-party software tool.

In one embodiment, the instance of software is configured to cause a graphical user interface to be displayed by an instance of frontend software instantiated by a client device communicably coupled to the server system, the graphical user interface allowing a user to request provisioning of the license to the third-party software tool on behalf of the licensee, the communication with the third-party API endpoint of the third-party system being initiated in response to user interaction with the graphical user interface.

In one embodiment, the instance of software is configured to combine the license provisioning information with one or more of additional information about the license and additional information about the third-party software tool to provide enriched license provisioning information. The enriched license provisioning information may be stored in the database. The additional information about the license may include one or more of information about a managed service provider (MSP) requesting provisioning of the license on behalf of the licensee, information about the licensee, and previously obtained information about the license from the third-party service.

In one embodiment, a server system includes a memory resource and a processing resource. The processing resource is operably intercoupled with the memory resource and configured to instantiate an instance of software configured to provide one or more license information API endpoints for receiving license information about a license to a third-party software tool from a third-party system, receive license information about the license from the third-party system via the one or more license information API endpoints, store the received license information in a database, in response to a request for information about the license to the third-party software tool: query the database to obtain the license information about the license to the third-party software tool, and provide a response to the request for information about the license to the third-party software tool based on the obtained license information about the license to the third-party software tool.

In one embodiment, the instance of software is configured to communicate with a third-party API endpoint to provide a request to provision the license to the third-party software tool. The request may include information about how to access the one or more license API endpoints.

In one embodiment, the license information includes license usage information describing usage of the license to the third-party software tool. In response to a request for an invoice related to usage of the third-party software tool, the software may be configured to query the database to obtain the license usage information for the license to the third-party software tool and generate an invoice based on the obtained license usage information.

In one embodiment, the instance of software is configured to cause a graphical user interface to be displayed by an instance of frontend software instantiated by a client device communicably coupled to the server system, the graphical user interface allowing a user to request information about the license to the third-party software tool. The request for information about the license to the third-party software tool may be provided from the client device to the server system in response to user interaction with the graphical user interface, and the response to the request for information about the license to the third-party software tool may be provided form the server system to the client device. The graphical user interface may be used to show information about the license to the third-party software tool in response to receipt of the response to the request for information about the license to the third-party software tool at the client device.

In one embodiment, the instance of software is configured to combine the license information with one or more of additional information about the license and additional information about the third-party software tool to provide enriched license information. The enriched license provisioning information may be stored in the database. The additional information about the license may include one or more of information about a managed service provider (MSP) requesting provisioning of the license on behalf of the licensee, information about the licensee, and previously obtained information about the license from the third-party service.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
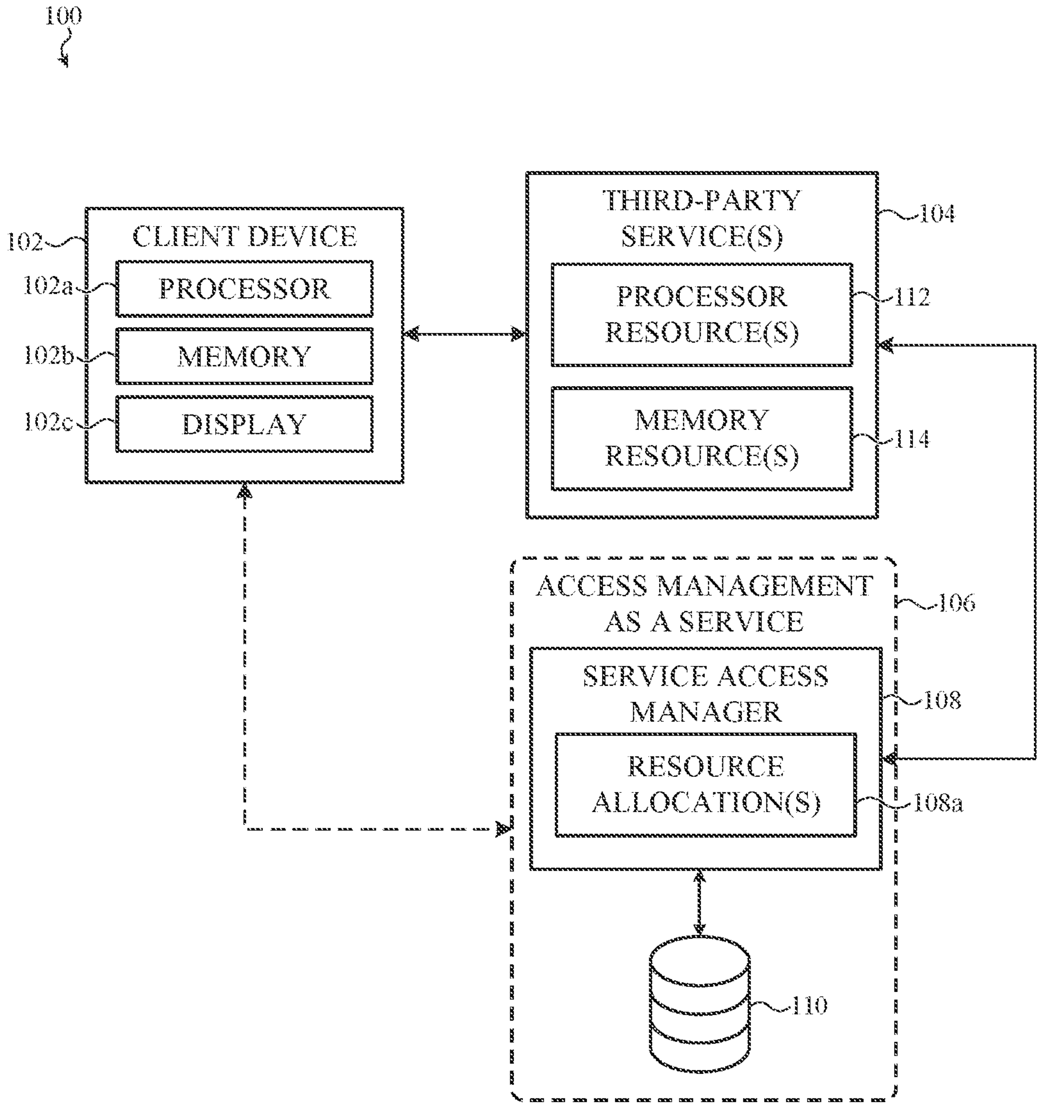
FIG. 1 depicts a system for providing access management as a service, such as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to computing systems, computer architectures, and computer-implemented methods configured to provide, control, and manage access to third-party software tools.

In particular, embodiments described herein relate to systems and methods for interfacing with software vendors (via third-party systems) to efficiently and robustly manage licenses for third-party software tools and reporting of information related to licenses third-party software tools.

More specifically, a system described herein communicates with third-party software providers (either by accessing third-party software provider application programming interface (API) endpoints and/or by providing an interface for communication with third-party software providers) to provide, control, and manage access to third-party software tools as a service via a unified interface. Such a system may drastically simplify license management and other functions of MSPs on behalf of the organizations engaging them.

Conventional access management systems have managed access to third-party software tools by communicating with third-party software provider API endpoints, each in a manner dictated by the third-party software provider. This includes customized implementation of APIs associated with vendor-specific license management operations, billing operations, usage reporting for each individual software vendor and each individual software product.

For example, an access management system may have used custom logic to generate a first request to a first third-party software provider API endpoint and generate a second request to a second third-party software provider API endpoint, where the requests were completely different from one another (e.g., the contents of the requests, the schema of the requests, the authorization for the requests, the flow of the requests, and/or the like, may be different between the requests). As the number of software providers supported by an access management system increases, overhead associated with supporting new and different custom interfaces for each third-party software provider API endpoint and ensuring the proper operation thereof may become burdensome. Maintaining such a system likewise consumes resources, as third parties may change or modify API schemas from time to time. A person of skill in the art can readily appreciate that maintaining such a conventional system is not practicable at scale.

A solution partially addressing the complexities associated with supporting API calls to hundreds of different API endpoints managed by different software vendors may include defining a standard reporting schema and requiring that all software vendors to transmit and/or otherwise structure data according to the schema. However, as may be appreciated by a person of skill in the art, this is not a practical solution as many software vendors will be unwilling and/or unable to dedicate software development resources to rearchitect and/or redesign their own internal systems to accommodate externally-defined data structure schemas, such as an access management system.

Another solution partially addressing the complexities associated with supporting API calls to hundreds of different API endpoints managed by different software vendors may include defining a standard reporting schema and requiring that all software vendors to implement particular API endpoints to receive particularly-formatted data. For example, the system may require third parties to implement an API endpoint to provision a new license, a different API endpoint to decommission an existing license and so on. However, as may be appreciated by a person of skill in the art, this like the previous example is not a practical solution as many software vendors will be unwilling and/or unable to dedicate software development resources to rearchitect and/or redesign their own internal systems to accommodate externally-defined data structure schemas, such as an access management system.

Another solution partially addressing the complexities associated with supporting API calls to hundreds of different API endpoints managed by different software vendors may include defining an API (hosted by an access management system) and requiring that all software vendors leverage that API to transmit information directly to the access management system. Such transmissions may include usage data, license data, and the like. However, as may be appreciated by a person of skill in the art, this is not a practical solution because, like the preceding examples, many software vendors will be unwilling and/or unable to dedicate software development resources to rearchitect and/or redesign their own internal systems to accommodate external APIs, such as an access control system. Further, it may be challenging to design a reliable and robust access management system configured to reliably receive hundreds if not thousands of simultaneous requests from an arbitrary number of third party systems.

To account for these and other potential design challenges, embodiments described herein define and leverage a bidirectional standard interface and protocol for arbitrary third-party software providers (also referred to herein as "software vendors") to communicate with and exchange information with a centralized access management system for (1) provisioning licenses to various third-party software tools of those providers and (2) reporting information related to provisioned licenses and usage of those third-party software tools by those providers to the access management system.

The bidirectional standard interface includes a standardized and uniform request format for provisioning a license, which may be initiated from the access management system to a third-party software provider API endpoint, a standard response format for third-party software providers to respond to requests from the access management system, and one or more API endpoints provided by the access management system for the reporting of information related to licenses of third-party software tools (e.g., license provisioning information, license usage information, or the like). Providing a standard interface for third-party software providers to communicate with the access management system may significantly simplify operation of the access management as well as improve the robustness of provisioning and license management.

As an example, an access management system described herein may communicate with one or more systems operated by or on behalf of a third-party to obtain a new license to a third-party software tool on behalf of a licensee. In doing so, the access management system may provide a request to provision a license to an API endpoint operated by or on behalf of the third-party. The format of the request may be dictated by the access management system, so that the request may be provided in the same format to different third-party systems opting to support the system. This may significantly simplify the operation of the access management system by reducing the need for custom logic for interfacing with different third-party systems.

Often, a third-party system will need to perform a number of operations to provision a license to a third-party software tool. One or more of these operations may take an appreciable amount of time. Accordingly, it may be desirable to allow the provisioning of the license to occur in an asynchronous manner. An access management system described herein may thus provide a license provisioning information API endpoint for receiving license provisioning information about the request to provision the license to the third-party software tool. As the third-party system performs operations to provision the license, the third-party system may report license provisioning information such as a current status of the provisioning back to the access management system via the license provisioning information API endpoint.

The status may be a simple state of the provisioning such as "success", "failure", or "in-progress", or may include more detailed information such as logs generated by the third-party system describing the operations to provision the license. Information about how to access the license provisioning information API endpoint may be provided as part of the initial request to the third-party system to provision the license. The format of requests to the license provisioning information API endpoint may be dictated by the access management system such that all third-party systems provide license provisioning information to the access management system in a standard manner. Again, this may drastically simplify the operation of the access management system be obviating the need for custom logic for processing information provided by third-party systems in the provisioning of a license.

In a more general sense, the access management system may provide one or more license information API endpoints for receiving license information about the license to the third-party software tool. The license information may include any information related to the license of the third-party software tool, such as a status of the license (e.g., "active," "inactive," "cancelled"), a usage of the license, or any other information. The access management system may collect license information from the third-party system via the license information API endpoints, and store the license information for later use. In some cases, the access management system may combine the license information with additional information such as information about an MSP that provisioned the license, information about a licensee of the license, previously collected license information, or any other information, before storing the license information in a database.

In response to requests for the license information, the access management system may query the database to obtain the license information and provide a response including the license information. In some embodiments, the access management system may process or otherwise alter the license information to generate reports, invoices, or other informational content including the license information to provide one or more license information applications.

FIG. 1 depicts a system 100 for providing access management as a service, such as described herein. The system 100 can include, in a simplified architecture, and/or be defined by communications by and between, a client device 102, a third-party service 104, and an access management service 106.

The client device 102 can be any suitable electronic device. Examples include, but are not limited to, cellular phones, laptop computers, desktop computers, server computers, and so on. More generally, the client device 102 may be any electronic device or computing resource configured to communicably intercouple (e.g., via one or more networks) to one or more other electronic devices, such as a server computer instantiating an instance of a third-party service 104 or a server computer executing an instance of the access management service 106.

In some cases, the access management service 106 can be operated to, among other operations, request provisioning of licenses to access the third-party service 104 on behalf of a user of the client device 102. For example, the access management service 106 can be configured to leverage an API of the third-party service 104 to automatically request provisioning/issuance of one or more licenses to access the third-party service 104. As discussed herein, provisioning of a license may include the issuance of a new license, alterations to an existing license, and/or cancellation of an existing license.

In many constructions the access management service 106 and the third-party service 104 are each implemented as instances of software executing over one or more virtual or physical resources associated with a cloud-based infrastructure, such as may be provided by a cloud services provider. In these embodiments, processing resources associated with, and/or allocated to, a particular server instance can cooperate with memory resources associated with the server instance to execute one or more computer readable instructions to instantiate an instance of software defining and/or implementing the third-party service 104 or the access management service 106.

More generally, although it may be appreciated that the third-party service 104 and the access management service 106 may be implemented in any number of ways and may be configured to communicate over a variety of protocols, in many embodiments each is implemented as a separate instance of cloud-based software supported by separate infrastructure.

It may be appreciated that the third-party service 104 can serve as a host of any suitable software product. Examples include, but are not limited to, email services, messaging services, instant messaging services, documentation services, office product services, word processing services, securing services, database services, design services, translation services, music and/or video production services, information technology infrastructure management services, and so on. These examples are not exhaustive.

As noted above, an access management service such as the access management service 106 can be configured to request and revoke software licenses to particular software products, such as to the third-party service 104. In addition, the access management service 106 can be configured to facilitate access to one or more functionalities of one or more third-party APIs (such as API endpoints provided by the third-party service 104). For example, the access management service 106 can be configured to access a license usage statistics API endpoint of a particular third-party API of the third-party service 104, or, in some embodiments, provide an interface by which the third-party service 104 can report license usage data to the access management service (e.g., provide an API endpoint at which the third-party service 104 can report license usage data).

More particularly, the access management service 106 can include a service access manager 108 in communication with a database 110 storing information regarding how to interface with one or more third-party services. As a result of this construction, the service access manager 108 can be configured to access the database 110 to determine how to interface with one or more third-party services.

In some examples, the access management service 106 and/or the service access manager 108 can be leveraged by an MSP to generate invoices based on the use of the third-party service 104 by a user of the client device 102. In other cases, the access management service 106 and/or the service access manager 108 can be leveraged by an MSP to generate invoices based on the use of the third-party service 104 by an organization associated with the client device 102. In other cases, the access management service 106 can be used by an MSP to support an organization's third-party licensing needs, such as described above.

As noted above, an organization may engage an MSP and/or a value-added reseller (VAR) to license access to, and/or actively administer, one or more third-party software tools, which may be referred to herein as "collaboration tools." Example collaboration tools include email services, telephony services, instant messaging systems, documentation systems, word processing systems, information technology management systems, ticketing systems, issue tracking systems, incident response systems, software repositories, design platforms, video and/or audio production platforms, networking platforms, identity management systems, and so on. A person skilled in the art may appreciate that these example collaboration tools are not exhaustive of all types of software tools that may be licensed by an organization for use by one or more employees; an organization may license access to collaboration tools developed and maintained by different third-party software providers (herein, software "vendors").

As an organization's collaboration tool library (and/or employee headcount) grow, licensing costs likewise increase as does the importance of active license management. Phrased another way, organizations and MSPs/VARs may often be tasked with regular auditing whether licenses are actively being used to identify unused licenses that can be terminated. The access management service 106 may streamline these tasks, ensuring that the correct number of licenses for an organization are maintained over time.

As discussed above, it may be desirable for the access management service 106 to have a standardized interface for communicating with the third-party services 104. This may include a standard format for requests to provision a license, as well as a number of API endpoints provided by the access management service 106 to receive license provisioning information, or, more generally, license information, from the third-party services 104 in a standardized manner. The access management service 106 may provide requests for provisioning of a license (e.g., creation of a new license, alteration of an existing license, cancellation of an existing license, or the like) to the third-party service 104. Subsequently, the access management service 106 may receive license provisioning information about the request for provisioning the license from the third-party service 104 at a license provisioning information API endpoint provided by the access management service 106. Further, the access management service 106 may receive license information about the license via one or more license information API endpoints from the third-party system 104.

The access management system 106 may store the license provisioning information and/or license information in a database for later use. In some cases, the access management system 106 may combine the license provisioning information and/or license information with other information, such as that obtained from operating access management as a service, to create a robust dataset including a state of a number of licenses managed by the access management system 106. For example, the access management system 106 may combine the license provisioning information and/or the license information with information about an MSP managing the license on behalf of a licensee (i.e., customer), information about the licensee, information about the third-party providing the third-party software tool, or any other information. The access management system 106 may process or otherwise alter the license provisioning information and/or the license information to generate reports, invoices, or other informational content.

These foregoing embodiments depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, the access management service 106 may use any suitable architecture for communicating with the third-party service 104. In previous access management systems, custom functions are used to access third-party APIs, each of which is tailored to a particular third-party API or APIs. As discussed above, this may generate significant overhead due to the use of custom logic for communicating with each third-party API. Accordingly, in some embodiments, a back-end application instance may be configured to host an API or set of APIs that third-party vendors communicate with in order to relay information relating to the licensing and/or usage of third-party software tools. In yet other examples, a monolithic, microservice, or hybrid architecture may be used. In short, the access management service 106 may provide the functionality described above in any suitable manner, and have any suitable system architecture.

Further, it may be appreciated that the client device 102 can be configured in any number of suitable ways. In one embodiment, the client device 102 is an electronic device that includes a processor 102*a*, a memory 102*b*, and a display 102*c*. The processor 102*a* and the memory 102*b* cooperate to instantiate an instance of software that can be configured to communicate with and/or exchange information with the service access manager 108 and/or the third-party service 104. In some examples, the instance of software may be referred to as a client application and/or frontend that corresponds to a backend instance operated at the third-party service 104 and/or the service access manager 108.

Similarly, the service access manager 108 may be one or more instances of software executing over one or more resource allocations 108*a*. The resource allocations 108*a* may be physical or virtual, and may be associated, for example, with a cloud-based infrastructure, such as may be provided by a cloud services provider. The resource allocations 108*a* may include processing resources cooperating with memory resources to execute one or more computer readable instructions to instantiate one more instances of software defining and/or implementing the service access manager 108.

The third-party service 104 may similarly be one or more instances of software executing over one or more processor resources 112 in connection with one or more memory resources 114. The processor resources 112 and the memory resources 114 may be physical or virtual, and may be associated, for example, with a cloud-based infrastructure, such as may be provided by a cloud services provider. Generally, the processor resources 112 and the memory resources 114 of the third-party service 104 are different from the resource allocations 108*a* of the service access manager 108, as the third-party service 104 and the service access manager 108 are different instances of software supported by separate infrastructure. The processor resources 112 may execute one or more computer readable instructions from the memory resources 114 to instantiate one or more instances of software defining and/or implementing the third-party service 104.

Figure 2:
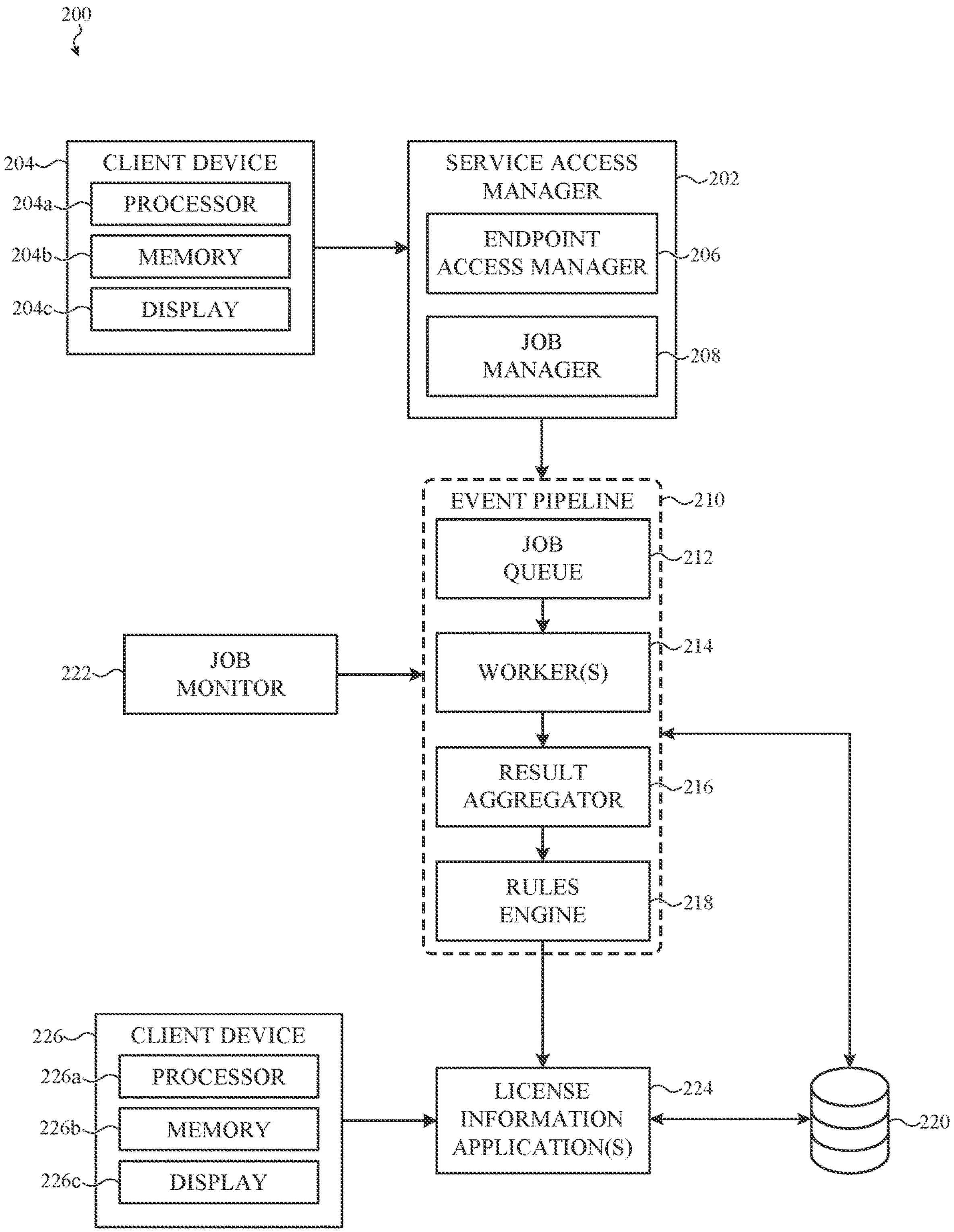
FIG. 2 depicts a system diagram of a system configured to provide access management as a service with automatic error attribution, such as described herein.

FIG. 2 depicts a system diagram of a system 200 configured to provide access management as a service, such as described herein.

As with other embodiments described herein, the system 200 includes a service access manager 202 which may be configured to receive command and control instructions from a device operated by an MSP, such as a client device 204. The MSP operating the client device 204 can issue instructions to the service access manager 202 on behalf of an organizational client of the MSP to provision one or more licenses to one or more third-party software tools, cancel one or more existing licenses to one or more third-party software tools, or obtain usage information about one or more third-party software tools, among other things.

In many cases, the client device 204 can be an electronic device such as the client device 102 of FIG. 1; the client device 204 can include a processor 204*a*, a memory 204*b*, and/or a display 204*c* that are configured to instantiate an instance of software configured to receive command and control instructions from a user (MSP) of the client device 204. More simply, the client device 204 can be configured in a similar manner as the client device 102 of FIG. 1, and thus any additional description thereof is not repeated.

Upon receiving an instruction from the client device 204, and/or in response to the occurrence of a scheduled event, the service access manager 202 can be configured to access one or more functions from an endpoint access manager 206. Each retrieved function can thereafter be wrapped, with appropriate arguments, into a job by a job manager 208.

Each job created by the job manager 208 can be added as input to an event pipeline 210, which can include a job queue 212. Job items or work items can be added to and removed from the job queue 212 in any suitable order. One or more worker nodes 214 can be configured to pop jobs from the job queue 212 to execute those jobs/work items against respective third-party APIs. In this manner individual functions, configured with suitable functions, can be executed in series and/or asynchronously.

Once a job successfully executes, the results of the execution can be passed to and/or otherwise received by a result aggregator 216. The result aggregator 216 can, in turn, bundle results of execution of one or more jobs as a single structured data object and can provide that structured data object to a rules engine 218, which may apply one or more rules to the structured data (e.g., as data transforms), based on the MSP initiating the job and/or the organization on behalf of which the MSP is acting. The results of the execution may be license provisioning information, which is information related to the provisioning of a license to a third-party software tool, or, more generally, license information, which is any information related to a license to a third-party software tool.

An MSP may interact with the service access manager 202 via the client device 204 to obtain licenses for third-party software tools on behalf of an organization, cancel licenses for third-party software tools on behalf of an organization, or obtain usage data about third-party software tools on behalf of an organization. Notably, the event pipeline represents one exemplary way of performing the various tasks that may be performed by the service access manager 202; those skilled in the art will appreciate that the same functionality may be performed using any number of different architectures, all of which are contemplated herein.

The license provisioning information and/or license information may be stored in a database 220 for later use. For example, information about the status of a provisioned license, information about the usage of a license, or any other information related to a license may be stored in the database.

A job monitor 222 may be configured to monitor execution of each job by each worker node 214 to determine whether the worker nodes 214 execute the jobs successfully. In an event that the job monitor 222 determines that a particular job has failed, the job monitor 222 may restart the job, generate a notification indicating that the job has failed, or take other action.

License provisioning information and/or license information may be used by one or more license information applications 224 to provide one or more functions related to the information. An additional client device 226 may communicate with the license information applications 224 to view or otherwise interact with information related to a license or licenses. The additional client device 226 may be an electronic device including a processor 226*a*, a memory 226*b*, and/or a display 226*c* that are configured to cooperate to instantiate an instance of software configured to display a graphical user interface for interacting with information related to one or more licenses for third-party software tools. For example, an invoicing license information application 224 may aggregate information (i.e., by querying the database 220) to generate an invoice for a customer of an MSP related to the use of one or more third-party software tools. As another example, a usage license information application 224 may aggregate information to generate a usage report for a customer of an MSP related to one or more third-party software tools. In general, the license information application 310 may display, manipulate, process, or otherwise interact with license provisioning information and/or license information to provide any number of functions.

These foregoing embodiments depicted in FIGS. 1-2 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

In the system 200 discussed in FIG. 2, custom functions are used to communicate with each third-party API endpoint. As discussed above, each of these custom functions must be created and maintained. Considering that the service access manager 202 may support thousands or more software vendors, each having several API endpoints that need to be accessed to provision and otherwise manage licenses, the number of custom functions required quickly becomes burdensome. Further, third-parties may change their API, necessitating updating of existing custom functions or the creation of new custom functions for interfacing therewith.

Figure 3:
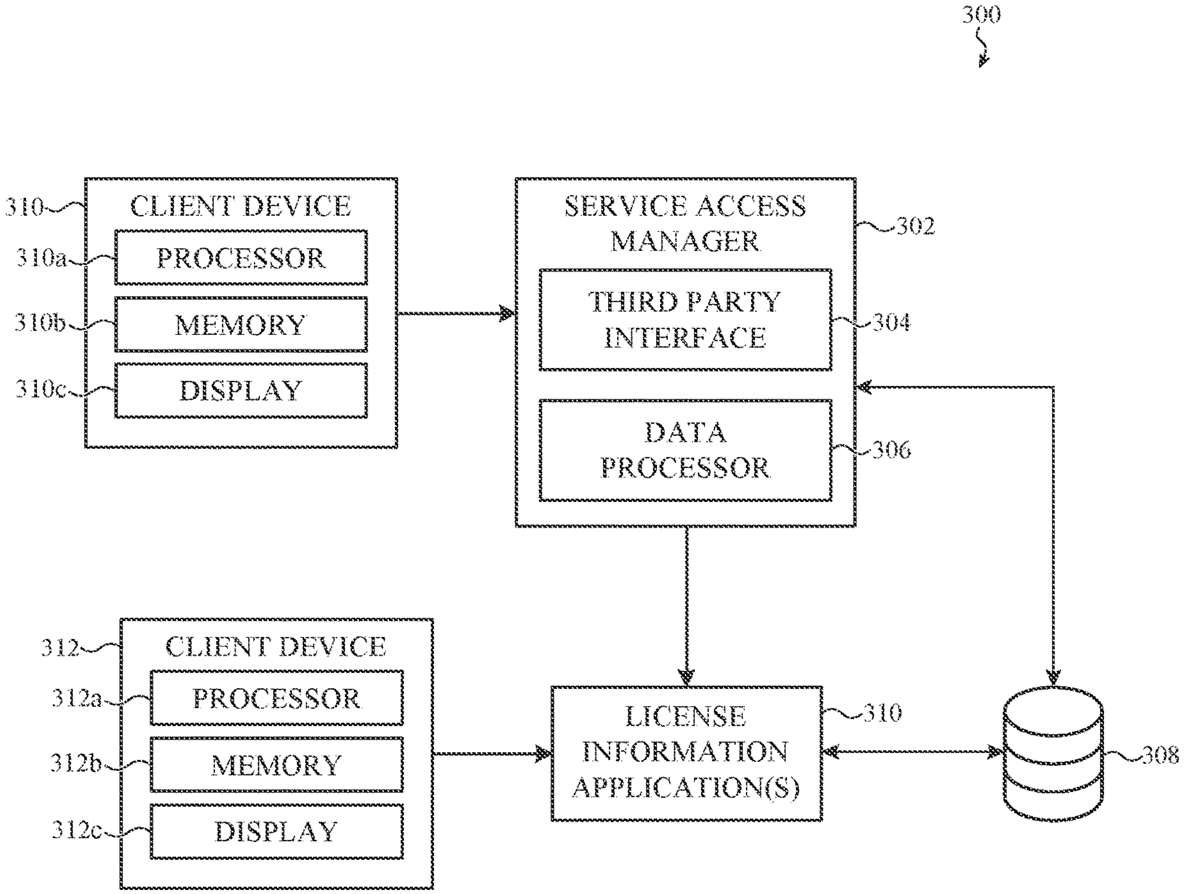
FIG. 3 depicts an alternative system diagram of a system configured to provide access management as a service with automatic error attribution, such as described herein.

FIG. 3 depicts an alternative architecture for a system 300 to the one described above in FIG. 2 wherein a service access manager 302 includes a third-party interface 304 and a data processor 306.

Similar to that described above, the service access manager 302 may receive command and control instructions from a device operated by an MSP, such as a client device 310. The MSP operating the client device 310 can issue instructions to the service access manager 302 on behalf of an organizational client of the MSP to provision one or more licenses for the organization to one or more third-party software tools, cancel one or more existing licenses to one or more third-party software tools, or obtain usage information about one or more third-party software tools, among other things. In many cases, the client device 310 can be an electronic device including a processor 310*a*, a memory 310*b*, and/or a display 310*c*, which operate as described above.

Upon receiving an instruction from the client device 310, and/or in response to the occurrence of a scheduled event, the service access manager 302 can be configured to communicate with a third-party service (e.g., via a third-party API) to provision licenses, cancel licenses, or obtain usage information. The third-party interface 304 may be responsible for initiating communication with the third-party service (e.g., by formulating a request corresponding to an API standard of the third-party service). In some embodiments, the third-party interface 304 may also provide an interface by which third-party services can communicate with the service access manager 302. For example, the third-party interface 304 may provide one or more API endpoints at which third-party services can report usage information about one or more third-party software tools, among other information, to the service access manager 302. In one specific example, the third-party interface 304 may initiate communication with a third-party service in order to provision one or more licenses of one or more third-party software tools. As part of the request to provision these licenses, information about how to access a license provisioning information API endpoint may be provided. In some embodiments, however, the information about how to access the license provisioning information API may be provided outside of the initial request for provisioning one or more licenses.

Regardless of how a third-party service is made aware of how to access the license provisioning information API endpoint, the license provisioning information API endpoint may be configured to receive license provisioning information about the one or more licenses, which is information related to the provisioning of the one or more licenses. For example, the license provisioning information may include a status of provisioning of the one or more licenses (e.g., "in-progress," "succeeded.", "failed." etc.), system logs of a third-party system performing the provisioning of the one or more licenses, or any other information relevant to the provisioning of the one or more licenses. Provisioning of licenses to third-party software tools can thus be performed asynchronously, wherein the service access manager 302 initiates the process and provides the license provisioning information API endpoint for receiving information from a third-party service related to the provisioning as it is available.

On receipt of license provisioning information from a third-party service, the service access manager 302 may process the license provisioning information at the data processor 306. For example, the data processor 306 may combine the license provisioning information with other information obtained in the course of providing access management as a service, such as information about the MSP managing the license associated with the license provisioning information, information about the licensee for the license associated with the license provisioning information, previously obtained information about the license associated with the license provisioning information, information about a software vendor of the third-party software tool of the license associated with the license provisioning information, or any other information collected or generated in the course of providing access management as a service. The combined information from the data processor 306 may be referred to as enriched license provisioning information, and may be stored in a database 308 for later use.

More generally, the third-party interface 304 may provide one or more license information API endpoints at which a third-party system can provide any information related to a license to a third-party software tool managed by the access management system. The license information may not be related to the provisioning of a license, but rather may be related to the license in any manner. Examples of license information include usage information associated with a particular license (i.e., whether a license is currently being used or not), pricing information associated with a license, or any other information related to the license.

Similar to the license provisioning information, on receipt of license information from a third-party service, the service access manager 302 may process the license information at the data processor 306. For example, the data processor 306 may combine the license information with other information obtained in the course of providing access management as a service, such as information about the MSP managing the license associated with the license information, information about the licensee for the license associated with the license information, previously obtained information about the license associated with the license information, information about a software vendor of the third-party software tool of the license associated with the license information, or any other information collected or generated in the course of providing access management as a service. The combined information from the data processor 306 may be referred to as enriched license information, and may be stored in the database 308 for later use.

License provisioning information and/or license information may be used by one or more license information applications 310 to provide one or more functions related to the information. An additional client device 312 may communicate with the license information applications to view or otherwise interact with the license provisioning information and/or license information. The additional client device 312 may be an electronic device including a processor 312*a*, a memory 312*b*, and/or a display 312*c* that are configured to cooperate to instantiate an instance of software configured to display a graphical user interface for interacting with the license provisioning information and/or license information. For example, an invoicing license information application 310 may aggregate information (i.e., by querying the database 308) to generate an invoice for a customer of an MSP related to the use of one or more third-party software tools. As another example, a usage license information application 310 may aggregate information to generate a usage report for a customer of an MSP related to one or more third-party software tools. In general, a license information application 310 may display, manipulate, process, or otherwise interact with license provisioning information and/or license information to provide any number of functions.

These foregoing embodiments depicted in FIGS. 1-3 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 4A:
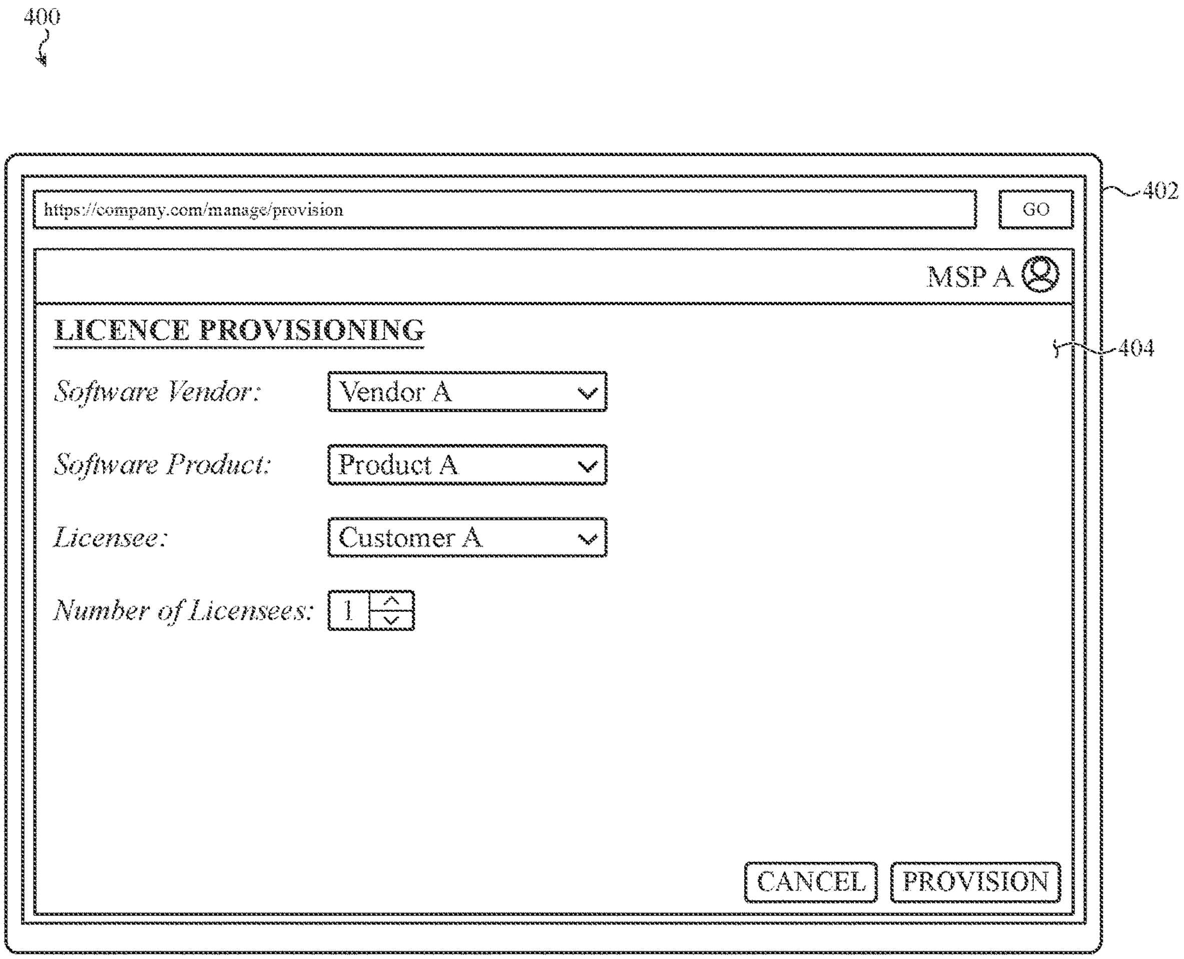
FIGS. 4A-4G depict a client device executing an instance of a client application rendering a graphical user interface of a system configured to provide access management as a service, such as described herein.

FIG. 4A depicts a client device 400 executing an instance of a client application rendering a graphical user interface of an access management system such as described herein.

The client device 400 includes a display 402 that can be operated by an instance of software initiated by cooperation of a processor and memory (not shown). The instance of software may be referred to as a frontend application, and may cause to be rendered on the display a graphical user interface 404. The graphical user interface 404 can include a content view area in which content associated with the frontend application can be rendered.

The frontend application is configured to allow a user to provision a license to a particular third-party software tool on behalf of a licensee. As shown, fields for selecting a software vendor, a third-party software tool of the software vendor, a licensee (customer) on behalf of which the MSP is managing the license, and a number of licenses are provided. Upon providing the necessary information into the fields, a user can provision a license or licenses using a "provision" button.

When the "provision" button is pressed, the frontend application may communicate with a backend access management service to begin the process described above wherein an a request is provided to a third-party API endpoint for provisioning the license.

Figure 4B:
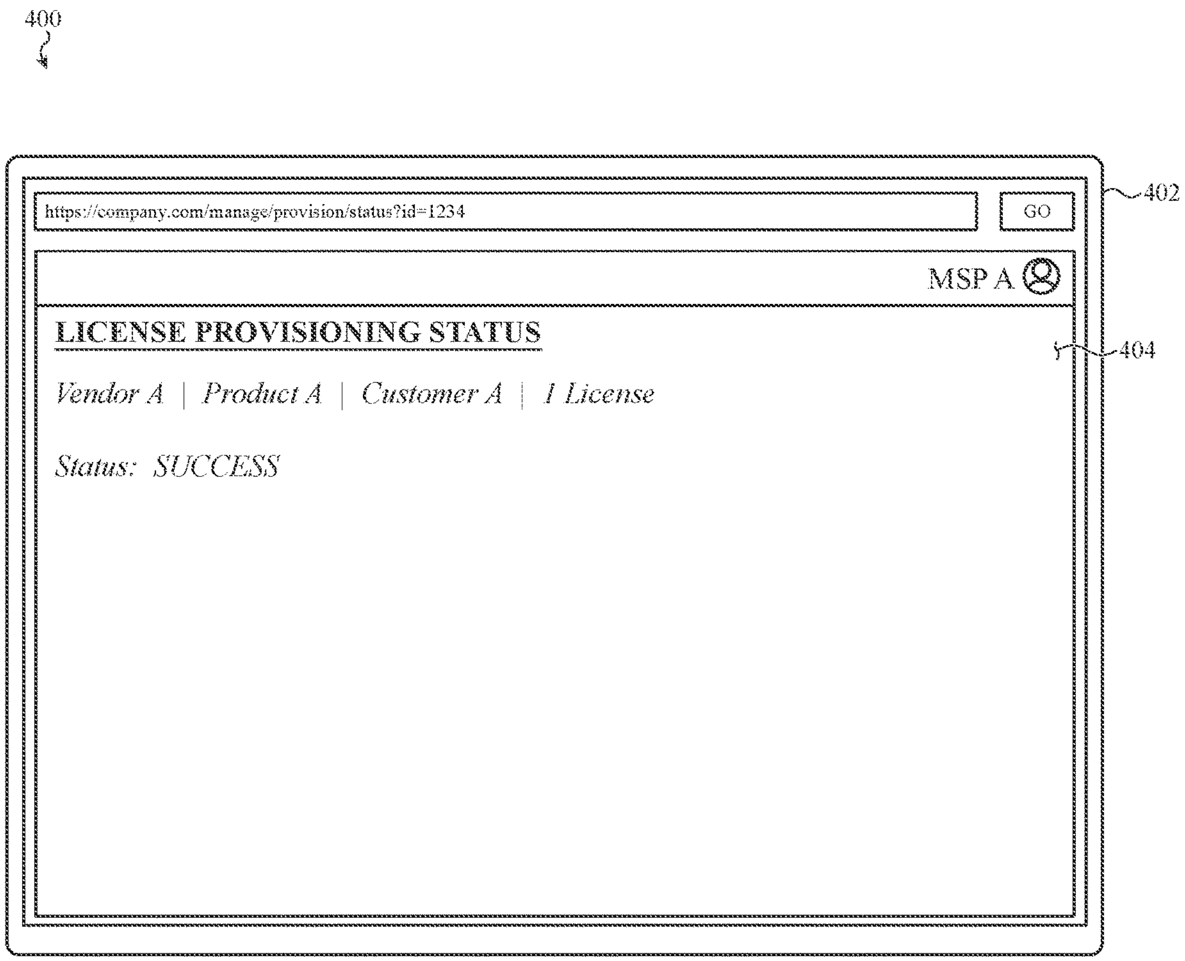

FIG. 4B shows the client device 400 including the display 402 rendering a different graphical user interface 404 showing a provisioning status page for a license or licenses. The provisioning status page may show license provisioning information received at a license provisioning API endpoint as discussed above. As shown in FIG. 4B, the provisioning status page shows a status of the provisioning of the license requested as a result of user interaction with the user interface 404 in FIG. 4A, where the provisioning is indicated as being successful.

Figure 4C:
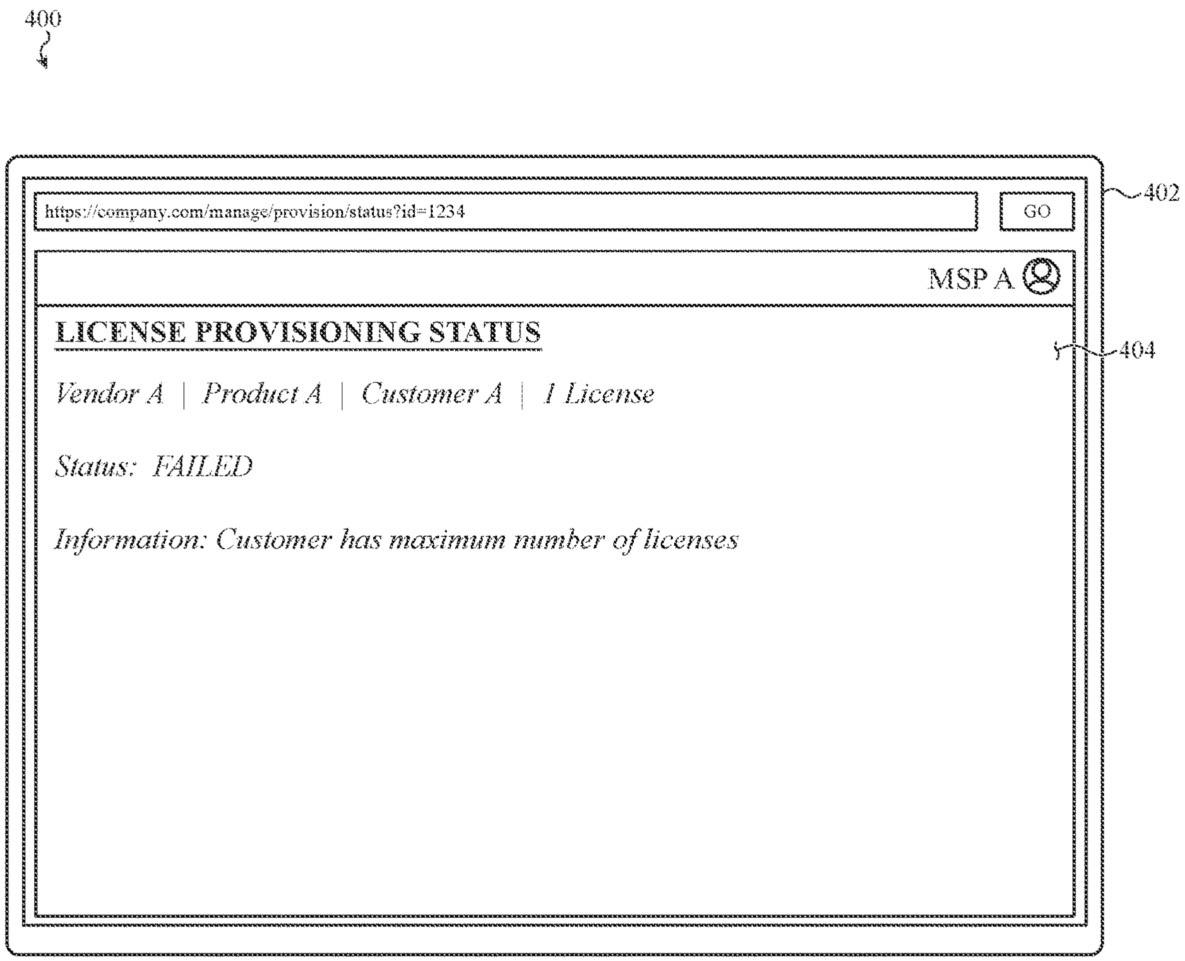

FIG. 4C shows the client device 400 including the display 402 rendering a different graphical user interface 404 showing another example of a provisioning status page for a license or licenses. The provisioning status page in FIG. 4C is substantially similar to that shown in FIG. 4B, except that the status is indicated as failed, and further details regarding a reason for the failure are also shown. While only a brief explanation regarding why the provisioning failed is shown, additional information such as logs from a third-party system performing the provisioning, may also be shown in various embodiments.

Figure 4D:
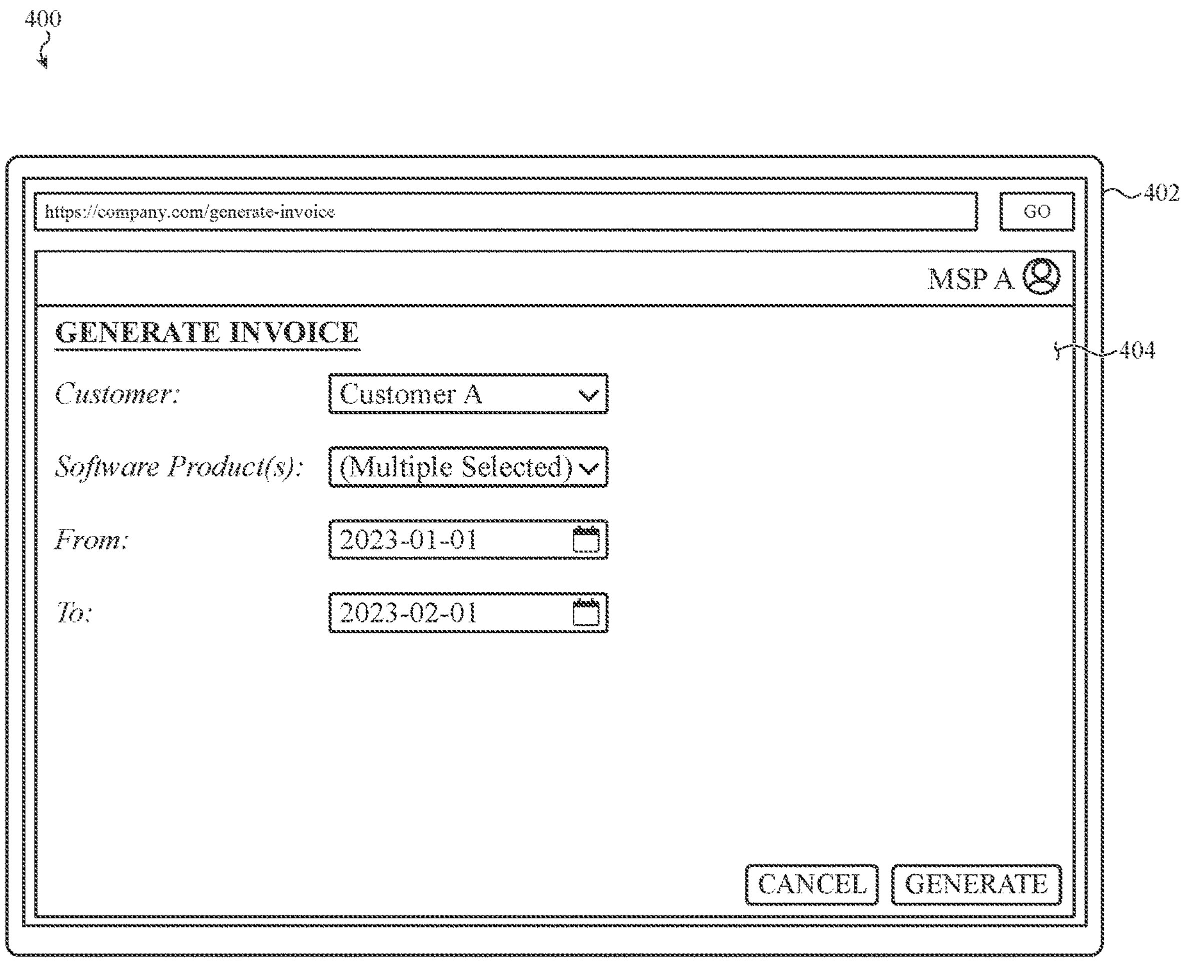

FIG. 4D shows the client device 400 including the display 402 rendering a different graphical user interface 404 showing an invoicing license information application. The invoicing license information application may allow an MSP to generate an invoice on behalf of a customer. Accordingly, fields for selecting a customer, one or more third-party software tools, and a date range are shown for generating an invoice with the appropriate parameters. Upon providing the correct information, a user can generate an invoice using a "generate" button.

Figure 4E:
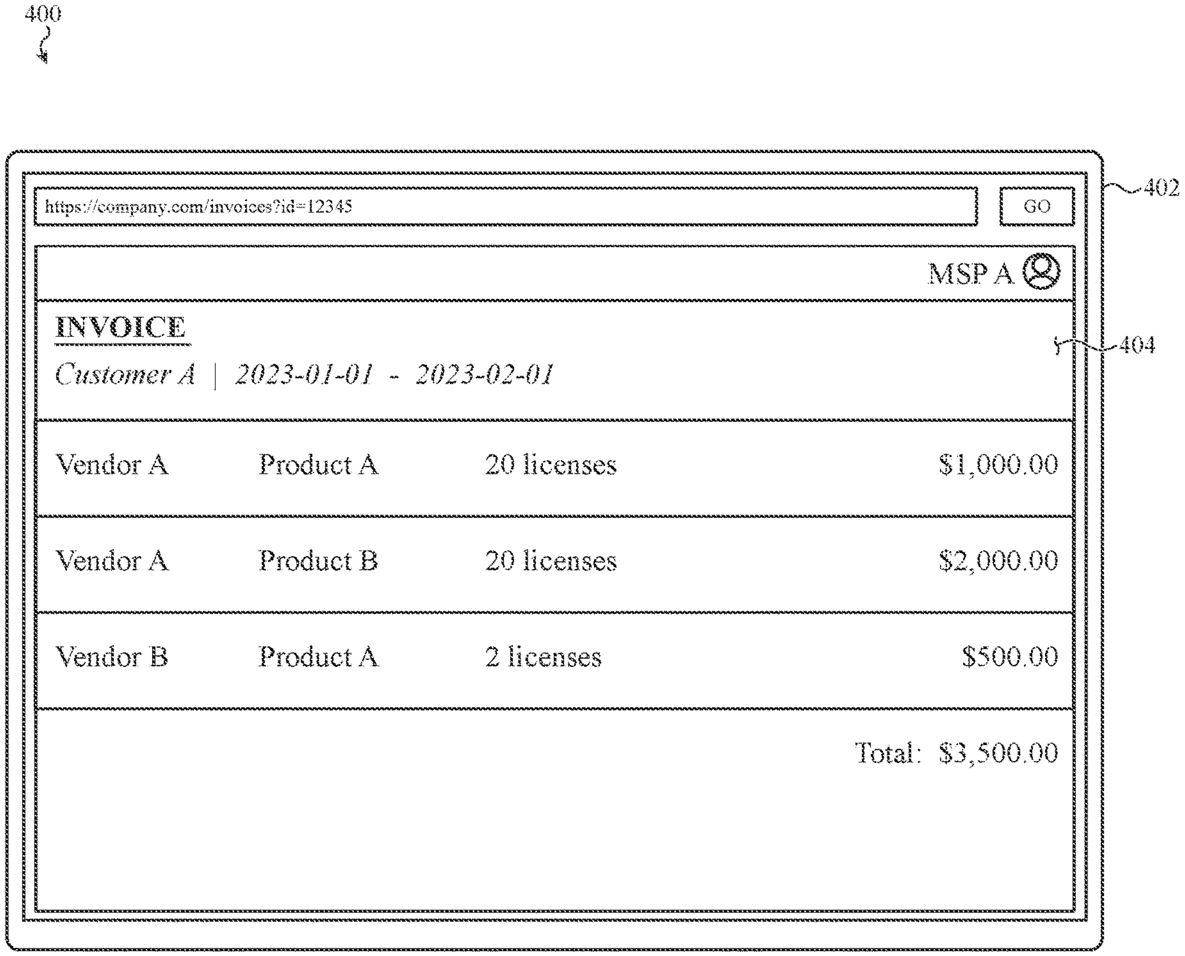

FIG. 4E shows the client device 400 including the display 402 rendering a different graphical user interface 404 showing the invoicing license information application. In particular, FIG. 4E shows a generated invoice from the invoicing license information application. The graphical user interface 404 shown in FIG. 4E may be rendered in response to a user pressing the "generate" button shown in FIG. 4D. As shown, an invoice including a number of line items is generated for a customer. To generate the invoice, the backend access management service may query a database including license provisioning information and/or license information and process or otherwise organize the license provisioning information and/or license information.

Figure 4F:
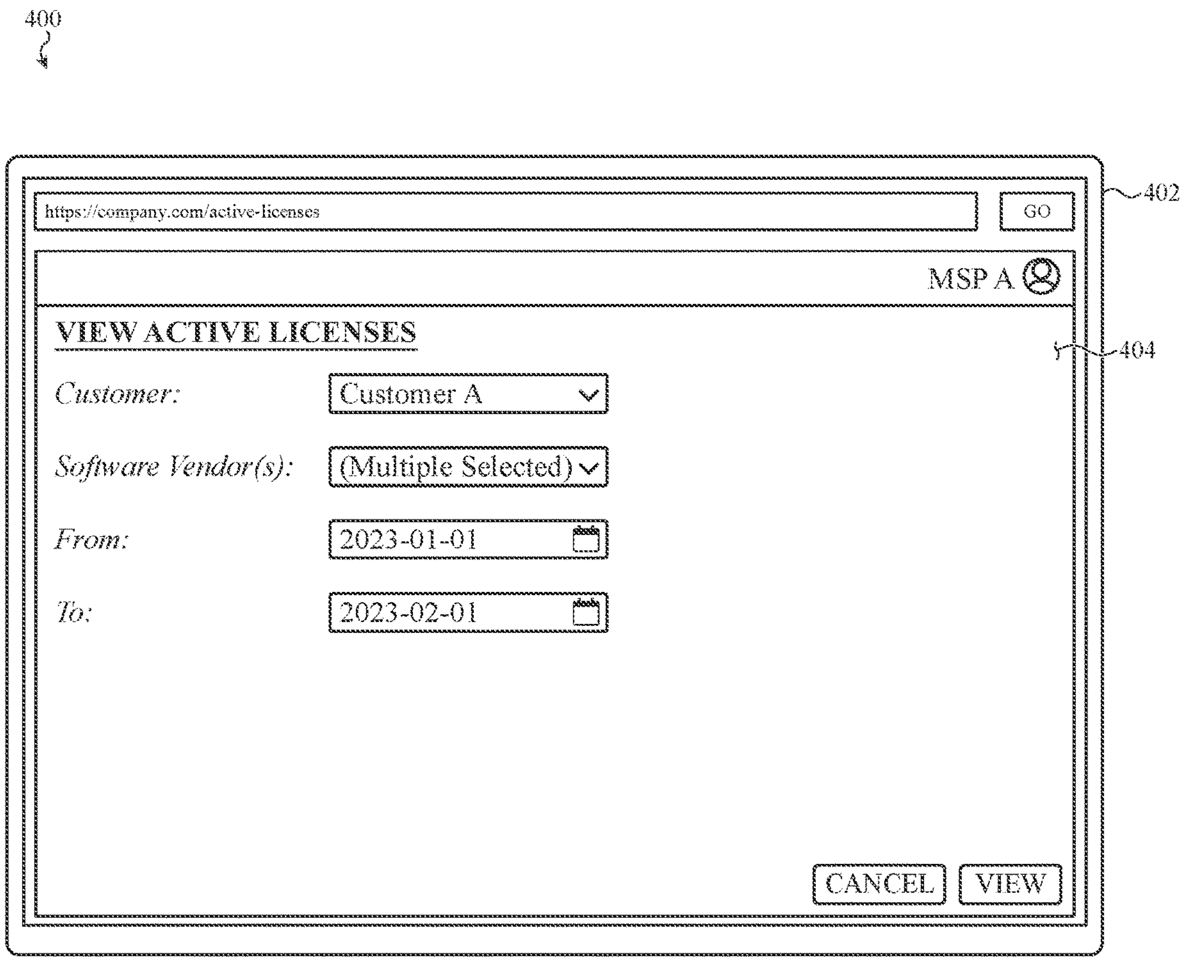

FIG. 4F shows the client device 400 including the display 402 rendering a different graphical user interface 404 showing a reporting license information application. The usage license information application may allow an MSP to generate a report showing a number of active licenses for a particular customer. Accordingly, fields for selecting a customer, one or more third-party software tools, and a date range are shown for generating a report with the appropriate parameters. Upon providing the correct information, a user can view a report using a "view" button.

Figure 4G:
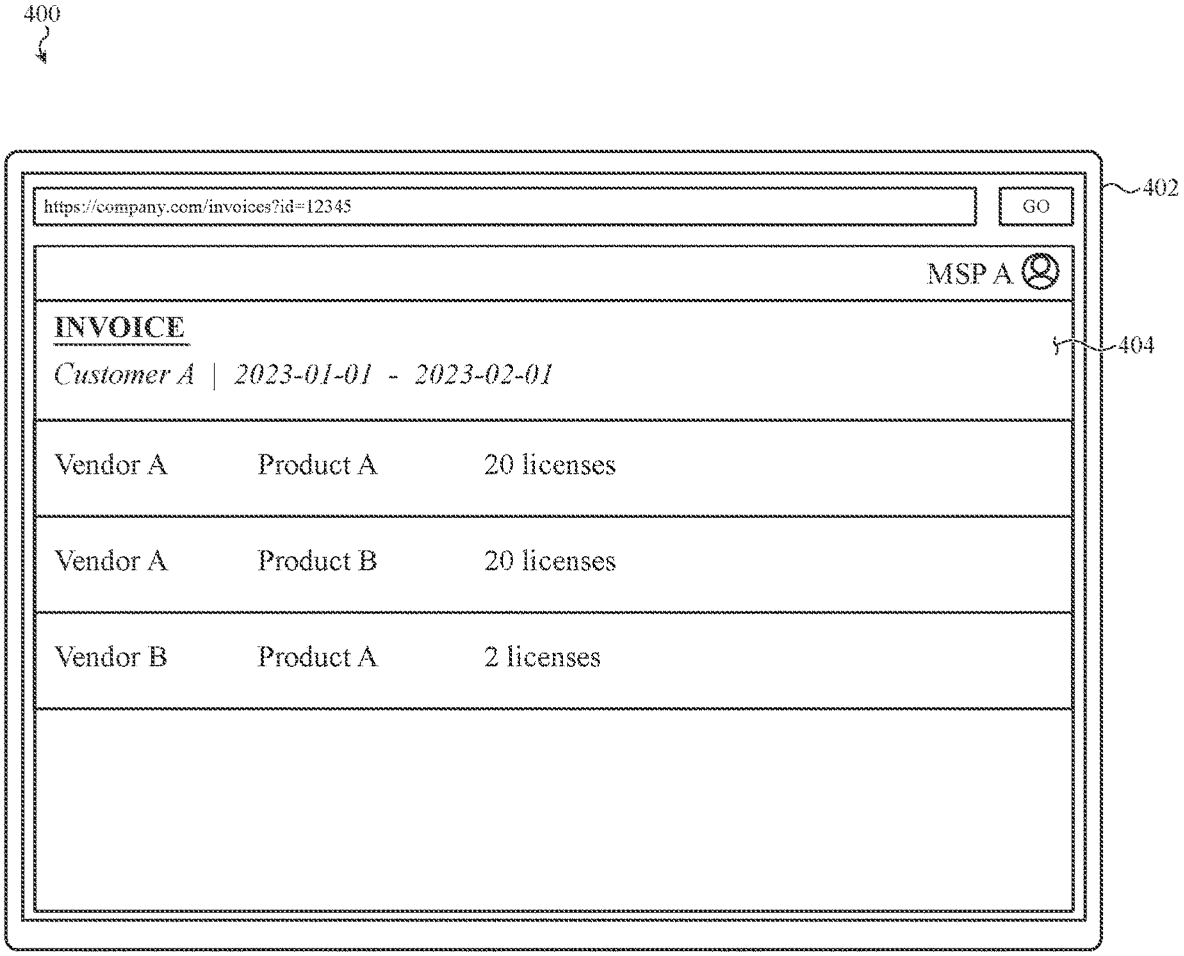

FIG. 4G shows the client device 400 including the display 402 rendering a different graphical user interface 404 showing the reporting license information application. In particular, FIG. 4G shows a report generated by the reporting license information application. The graphical user interface 440 of FIG. 4G may be rendered in response to a user pressing the "view" button shown in FIG. 4F. As shown, a report including a number of active licenses is generated for the customer. To generate the report, the backend access management service may query a database including license provisioning information and/or license information and process or otherwise organize the license provisioning information and/or license information.

Notably, FIGS. 4A-4G are simplified examples depicting example functionality of an access management service, and are not exhaustive. Generally, an access management service described herein may provide myriad graphical user interfaces for facilitating the provisioning of licenses, as well as applications utilizing license provisioning information and/or license information.

The foregoing embodiments depicted in FIGS. 4A-4G and the various alternatives thereof and variations thereto are presented, generally, for purposes of explanation, and to facilitate an understanding of various configurations and constructions of a user interface that may be associated with a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that may modifications and variations are possible in view of the above teachings.

Figure 5:
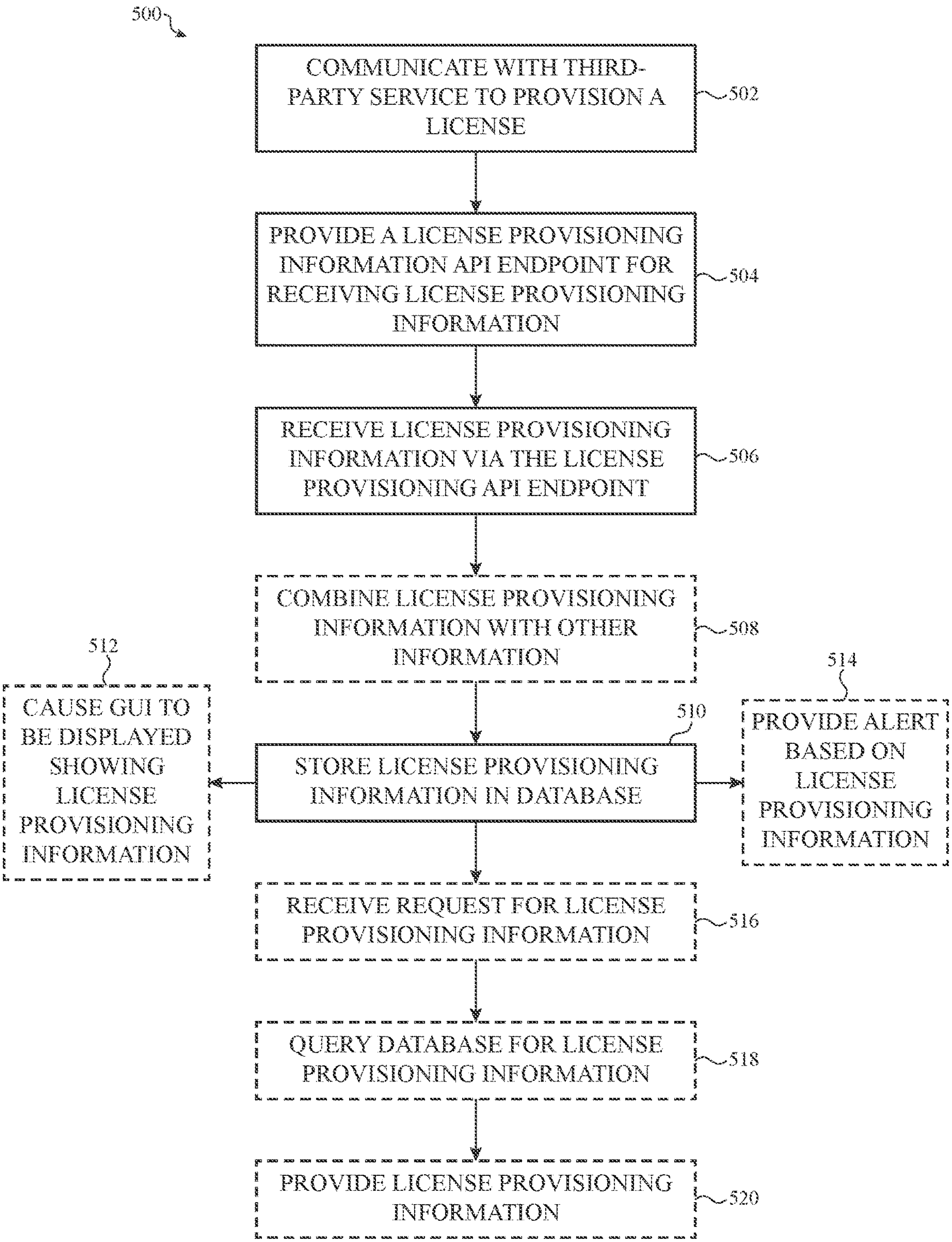
FIG. 5 is a flowchart depicting example operations of a method for providing access management as a service, such as described herein.

FIG. 5 is a method diagram depicting a flowchart of operations of a method 500 of operating an access management system.

The method includes operation 502 at which the access management system communicates with a third-party service to provision a license to a third-party software tool of the third-party. The access management system may initiate this operation in response to user interaction (e.g., by an MSP on behalf of a licensee), or in response to some other event such as a scheduled job. To do so, the access management system may provide a request to provision the license to a third-party API endpoint. At operation 504, a license provisioning information API endpoint is provided for receiving license provisioning information from the third-party service. As discussed above, license provisioning information may include any information related to the provisioning of the license, such as a status of the provisioning, logs generated by the third-party system in the course or provisioning the license, or any other information. In some embodiments, information about how to access the license provisioning information API endpoint is provided to the third-party service as part of the request to the third-party API endpoint.

At operation 506, license provisioning information is received at the license provisioning information API endpoint. The license provisioning information is received from the third-party service. As discussed above, it may take the third-party system some appreciable amount of time to provision the license to the third-party software tool, and thus the license provisioning information may be received asynchronously with some delay with respect to the request to provision the license. At optional operation 508, the license provisioning information may be combined with other information. The other information may be any information collected or generated in the course of operating the access management service, such as information about an MSP requesting provisioning of the license, information about a licensee for the license, information about the third-party, including information about the third-party service and/or information about the third-party software tool, or any other information. As discussed herein, the combined license provisioning information and other information may be referred to as enriched license provisioning information. The license provisioning information (either combined with other information, or alone) is stored in a database in operation 510.

At optional operation 512, the access management system may cause a graphical user interface to be displayed showing the license provisioning information. The graphical user interface may represent a license information application as discussed above, such as an invoicing license information application, a reporting license information application, a status license information application, or the like. To cause a graphical user interface to be displayed, the access management system may communicate with a client device, which instantiates an instance of frontend software for rendering the graphical user interface. A backend application may communicate with the frontend application to cause the frontend application to render the graphical user interface.

At optional operation 514, an alert is provided based on the license provisioning information. For example, an alert may be provided to an MSP when license provisioning information indicates that provisioning of the license has failed. As another example, an alert may be provided to a licensee when license provisioning information indicates that provisioning of the license has succeeded and thus the third-party software tool is ready to use. The alert may be provided in any suitable manner, such as by email, messaging service, push notification, or the like.

At optional operation 516, a request for the license provisioning information is received. The request for license provisioning information may be received at an API endpoint provided by the access management service. In response to the request for the license provisioning information, the access management service may query the database for the information at optional operation 518. The license provisioning information may then be provided as a response to the request at optional operation 520. The request, query, response operations 516-520 may represent operations of a backend application of the access management system for supporting one or more frontend applications for displaying or otherwise interacting with the license provisioning information.

Figure 6:
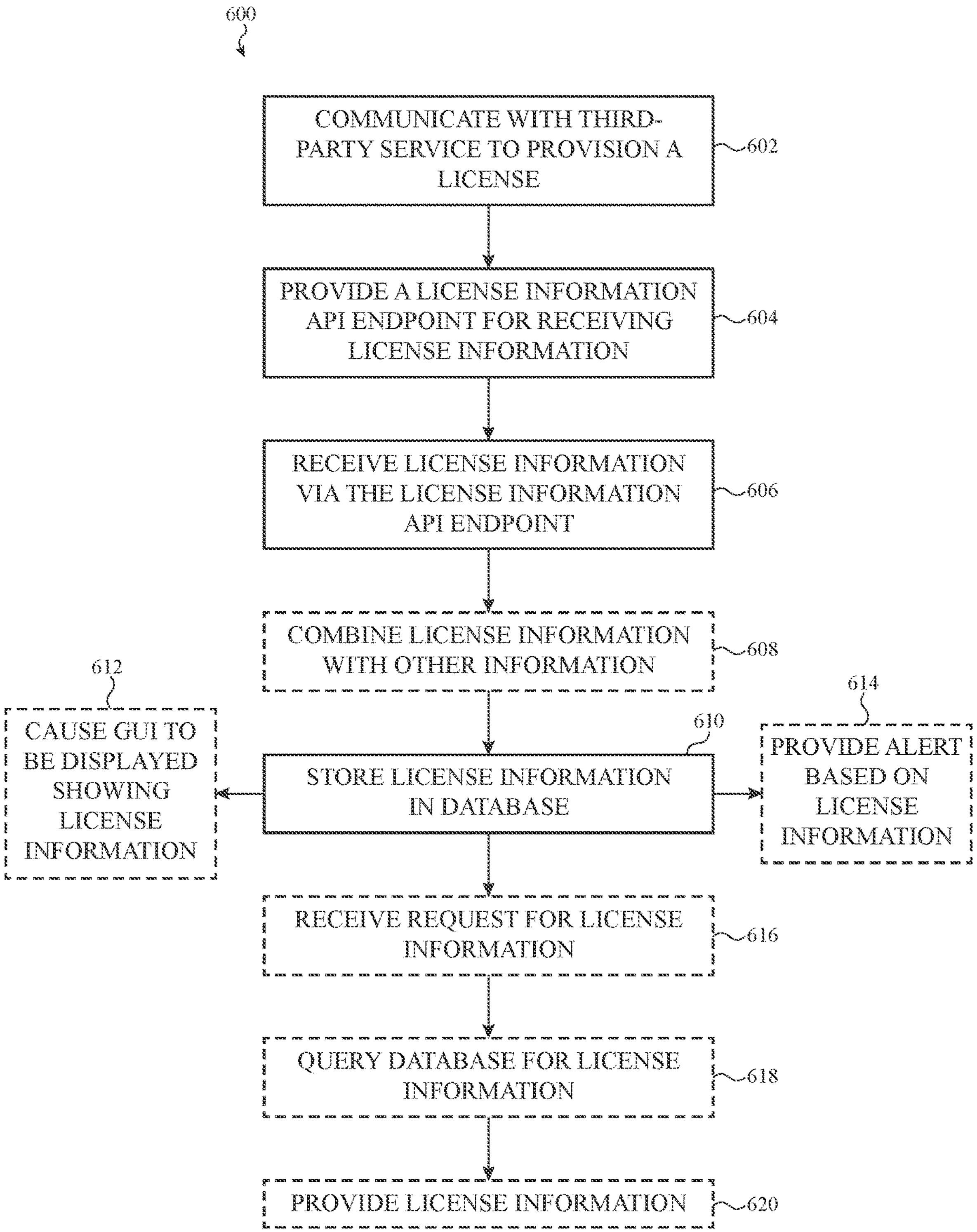
FIG. 6 is a flowchart depicting example operations of a method for providing access management as a service, such as described herein.

FIG. 6 is a method diagram depicting a flowchart of operations of a method 600 of operating an access management system.

The method 600 in FIG. 6 is similar to the method 500 in FIG. 5, but applies more generally to license information instead of license provisioning information. At operation 602. the access management system communicates with a third-party system to provision a license to a third-party software tool of the third-party. The access management system may initiate this operation in response to user interaction (e.g., by an MSP on behalf of a licensee), or in response to some other event such as a scheduled job. To do so, the access management system may provide a request to provision the license to a third-party API endpoint. At operation 604, a license information API endpoint is provided for receiving license information from the third-party service. As discussed above, license information is any information related to the license, such as usage information related to the license, pricing information related to the license, or any other information. In some embodiments, information about how to access the license information API endpoint is provided to the third-party service as part of the request to the third-party API endpoint.

At operation 606, license information is received at the license information API endpoint. The license information is received from the third-party service. The license information may be received at any time from the third-party service, such as at a given interval, as changes to the license information are observed in the third-party system, or the like. Generally, this allows the access management system to maintain more up-to-date license information than previous access management systems that relied on polling the third-party service to update license information. At optional operation 608, the license information may be combined with other information. The other information may be any information collected or generated in the course of operating the access management service, such as information about an MSP that requesting provisioning of the license, information about a licensee for the license, information about the third-party, including information about the third-party service and/or the third-party software tool, or any other information. As discussed herein, the combined license information and other information may be referred to as enriched license information. The license information (either combined with other information, or alone) is stored in a database in operation 610.

At optional operation 612, the access management system may cause a graphical user interface to be displayed showing the license information. The graphical user interface may represent a license information application as discussed above, such as an invoicing license information application, a reporting license information application, a status license information application, or the like. To cause a graphical user interface to be displayed, the access management system may communicate with a client device, which instantiates an instance of frontend software for rendering the graphical user interface. A backend application may communicate with the frontend application to cause the frontend application to render the graphical user interface.

At optional operation 614, an alert is provided based on the license information. For example, an alert may be provided to an MSP when a license for a third-party software tool has not been used in some period of time, so that the MSP can take action to cancel the license and thus save the customer money. The alert may be provided in any suitable manner, such as by email, messaging service, push notification, or the like.

At optional operation 616, a request for the license information is received. The request for license information may be received at an API endpoint provided by the access management service. In response to the request for the license information, the access management service may query the database for the information at optional operation 618. The license provisioning information may then be provided as a response to the request at optional operation 620. The request, query, response operations 616-620 may represent operations at a backend application of the access management system for supporting one or more frontend application for displaying or otherwise interacting with the license information.

These foregoing embodiments depicted in FIGS. 1-6 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

As used herein, the term "computing resource" (along with other similar terms and phrases, including, but not limited to, "computing device" and "computing network") refers to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

Example information can include, but may not be limited to: personal identification information (e.g., names, social security numbers, telephone numbers, email addresses, physical addresses, driver's license information, passport numbers, and so on); identity documents (e.g., drivers licenses, passports, government identification cards or credentials, and so on); protected health information (e.g., medical records, dental records, and so on); financial, banking, credit, or debt information; third-party service account information (e.g., usernames, passwords, social medial handles, and so on); encrypted or unencrypted files; database files; network connection logs; shell history; filesystem files; libraries, frameworks, and binaries; registry entries; settings files; executing processes; hardware vendors, versions, and/or information associated with the compromised computing resource; installed applications or services; password hashes; idle time, uptime, and/or last login time; document files; product renderings; presentation files; image files; customer information; configuration files; passwords; and so on. It may be appreciated that the foregoing examples are not exhaustive.

The foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

As described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

What is claimed is:

1. A server system comprising:

a memory; and a processor operably intercoupled with the memory and configured to instantiate an instance of software configured to:

transmit a first request to a first third-party system via a first third-party application programming interface (API) endpoint provided by the first third-party system, the first request comprising an instruction to provision a first license to a first third-party software tool on behalf of a licensee;

transmit a second request to a second third-party system via a second third-party API endpoint provided by the second third-party system, the second request comprising an instruction to provision a second license to a second third-party software tool on behalf of the licensee, the second third-party system different from the first third-party system;

define a license information API to receive licensing information from each of the first third-party system and the second third-party system, the license information API comprising a license provisioning information API endpoint for receiving license provisioning information about the first and second requests to provision the first and second licenses, respectively;

receive first license provisioning information about the first request to provision the first license to the first third-party software tool from the first third-party system via the license provisioning API endpoint;

combine the first license provisioning information about the first request with one or more of additional information about the first license and additional information about the first third-party software tool to provide enriched license provisioning information;

receive second license provisioning information about the second request to provision the second license to the second third-party software tool from the second third-party system via the license provisioning API endpoint; and store the received second license provisioning information and the enriched license provisioning information in a database.

2. The server system of claim 1, wherein the first request to provision the first license to the first third-party software tool comprises information about how to access the license provisioning information API endpoint.

3. The server system of claim 1, wherein the instance of software is configured to:

detect an error related to the provisioning of the first license to the first third-party software tool based on the first license provisioning information.

4. The server system of claim 1, wherein the first license provisioning information comprises a status of the first request to provision the first license to the first third-party software tool in the first third-party system.

5. The server system of claim 4, wherein the status indicates whether provisioning of the first license to the first third-party software tool succeeded, failed, or is in progress.

6. The server system of claim 1, wherein the instance of software is configured to:

cause a graphical user interface to be displayed by an instance of frontend software instantiated by a client device communicably coupled to the server system, the graphical user interface showing the first and second license provisioning information.

7. The server system of claim 6, wherein the graphical user interface shows a provisioning status of the first license to the first third-party software tool.

8. The server system of claim 1, wherein the instance of software is configured to:

cause a graphical user interface to be displayed by an instance of frontend software instantiated by a client device communicably coupled to the server system, the graphical user interface allowing a user to request provisioning of the first license to the first third-party software tool on behalf of the licensee, communication with the first third-party API endpoint of the first third-party system being initiated in response to user interaction with the graphical user interface.

9. The server system of claim 1, wherein the additional information about the license includes one or more of information about a managed service provider (MSP) requesting provisioning of the first license on behalf of the licensee, information about the licensee, and previously obtained information about the first license from the first third-party system.

10. A computer readable medium storing computer program instructions that when executed by a processor of a computing system cause the processor to:

transmit a first request to a first third-party system via a first third-party application programming interface (API) endpoint provided by the first third-party system, the first request comprising an instruction to provision a first license to a first third-party software tool on behalf of a licensee;

transmit a second request to a second third-party system via a second third-party API endpoint provided by the second third-party system, the second request comprising an instruction to provision a second license to a second third-party software tool on behalf of the licensee, the second third-party system different from the first third-party system;

define a license information API to receive licensing information from each of the first third-party system and the second third-party system, the license information API comprising a license provisioning information API endpoint for receiving license provisioning information about the first and second requests to provision the first and second licenses, respectively;

receive first license provisioning information about the first request to provision the first license to the first third-party software tool from the first third-party system via the license provisioning API endpoint;

combine the first license provisioning information about the first request with one or more of additional information about the first license and additional information about the first third-party software tool to provide enriched license provisioning information;

receive second license provisioning information about the second request to provision the second license to the second third-party software tool from the second third-party system via the license provisioning API endpoint; and store the received second license provisioning information and the enriched license provisioning information in a database.

11. The computer-readable medium of claim 10, wherein the first request to provision the first license to the first third-party software tool comprises information about how to access the license provisioning information API endpoint.

12. The computer-readable medium of claim 10, wherein the computer program instructions cause the processor to:

detect an error related to the provisioning of the first license to the first third-party software tool based on the first license provisioning information.

13. The computer-readable medium of claim 10, wherein the first license provisioning information comprises a status of the first request to provision the first license to the first third-party software tool in the first third-party system.

14. The computer-readable medium of claim 13, wherein the status indicates whether provisioning of the first license to the first third-party software tool succeeded, failed, or is in progress.

15. A method comprising:

transmitting a first request to a first third-party system via a first third-party application programming interface (API) endpoint provided by the first third-party system, the first request comprising an instruction to provision a first license to a first third-party software tool on behalf of a licensee;

transmitting a second request to a second third-party system via a second third-party API endpoint provided by the second third-party system, the second request comprising an instruction to provision a second license to a second third-party software tool on behalf of the licensee, the second third-party system different from the first third-party system;

defining a license information API to receive licensing information from each of the first third-party system and the second third-party system, the license information API comprising a license provisioning information API endpoint for receiving license provisioning information about the first and second requests to provision the first and second licenses, respectively;

receiving first license provisioning information about the first request to provision the first license to the first third-party software tool from the first third-party system via the license provisioning API endpoint;

combining the first license provisioning information about the first request with one or more of additional information about the first license and additional information about the first third-party software tool to provide enriched license provisioning information;

receiving second license provisioning information about the second request to provision the second license to the second third-party software tool from the second third-party system via the license provisioning API endpoint; and storing the received second license provisioning information and the enriched license provisioning information in a database.

16. The method of claim 15, wherein the first request to provision the first license to the first third-party software tool comprises information about how to access the license provisioning information API endpoint.

17. The method of claim 15, comprising:

detecting an error related to the provisioning of the first license to the first third-party software tool based on the first license provisioning information.

18. The method of claim 15, wherein the first license provisioning information comprises a status of the first request to provision the first license to the first third-party software tool in the first third-party system.

19. The method of claim 18, wherein the status indicates whether provisioning of the first license to the first third-party software tool succeeded, failed, or is in progress.

20. The method of claim 15, comprising:

causing a graphical user interface to be displayed by an instance of frontend software instantiated by a client device communicably coupled to the server system, the graphical user interface showing the first and second license provisioning information.

* * * * *